(12) United States Patent
Vasquez et al.

(10) Patent No.: US 7,627,182 B2
(45) Date of Patent: Dec. 1, 2009

(54) METHOD AND APPARATUS FOR VARIED FORMAT ENCODING AND DECODING OF PIXEL DATA

(75) Inventors: Maximino Vasquez, Fremont, CA (US); Pierre Selwan, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 678 days.

(21) Appl. No.: 11/323,930

(22) Filed: Dec. 30, 2005

(65) Prior Publication Data

US 2007/0160139 A1 Jul. 12, 2007

(51) Int. Cl.
*G06K 9/36* (2006.01)
*H04N 7/12* (2006.01)
*G06K 9/46* (2006.01)

(52) U.S. Cl. .................................. 382/232; 375/240.08

(58) Field of Classification Search ................. 382/166, 382/232, 233, 239, 243, 247, 248, 251; 375/240.01, 375/240.03, 240.08; 348/223.1, 409.1, 419.1; 345/467, 551, 600–611; 341/107; 715/201, 715/788; 717/114
See application file for complete search history.

(56) References Cited

U.S. PATENT DOCUMENTS

| | | | | |
|---|---|---|---|---|
| 3,579,196 A | * | 5/1971 | Gregg et al. ................. | 715/201 |
| 3,872,460 A | * | 3/1975 | Fredrickson et al. ........ | 715/788 |
| 4,408,200 A | * | 10/1983 | Bradley ....................... | 345/467 |
| 5,444,800 A | * | 8/1995 | Kim ............................ | 382/239 |
| 5,619,269 A | * | 4/1997 | Lee et al. ............... | 375/240.01 |
| 6,266,449 B1 | * | 7/2001 | Ohsawa ...................... | 382/239 |
| 6,522,783 B1 | * | 2/2003 | Zeng et al. .................. | 382/239 |
| 6,618,079 B1 | * | 9/2003 | Higuchi .................... | 348/223.1 |
| 7,139,434 B2 | * | 11/2006 | Schwartz .................... | 382/233 |
| 2007/0160139 A1 | * | 7/2007 | Vasquez et al. ........ | 375/240.08 |

* cited by examiner

*Primary Examiner*—Amir Alavi
(74) *Attorney, Agent, or Firm*—Buckley, Maschoff & Talwalkar LLC (57) ABSTRACT

An apparatus, system, and method for encoding video pixels is provided in some embodiments. At least one encoder may encode a video pixel data as a symbol. A selection unit may select the symbol. A selection of the symbol is a function of a pixel format that is of one of a plurality of pixel formats employable the apparatus, system or method.

17 Claims, 11 Drawing Sheets

METHOD AND APPARATUS FOR VARIED FORMAT ENCODING AND DECODING OF PIXEL DATA

BACKGROUND

Current high speed serial links may be digitally transmitted on a bit level, and can utilize a "8b/10b" symbol encoding format (8 bits of data being transmitted as a 10 bit symbol). Symbols can be used, for instance, to transfer data associated with video pixels. If a primary color (such as red, green, or blue) is encoded with a pixel color width of 8 bits, (i.e., each color has $2^8$ bits=256 variations in intensity), there can be $256^3$ color (16,777,216) color variations when the three primary colors are mixed.

However, video pixels for a given color are not always formatted in a standard 8 video bits per color. For instance, video pixel formats for various colors can be in 10 bit per color, 12 bits per color, or other sizes. For pixel widths other than 24 bits, 8 bits per color (i.e., 3 bytes of 8, one byte of pixel information per primary color) this can create complications.

For instance, in a first case, for pixel color widths other than 8 bits, pixel data is forced into an 8 bit symbol encoding format by wasting bits. For instance, a 12 bit per color format can be characterized as 2 8 bit symbols, wasting 4 bits. This is typically done so that a symbol clock maintains an integer relationship to a pixel clock. However, wasting bits is inefficient and may lead to higher complexity an power.

Alternatively, in a second case, no bits are wasted when converting pixel data into a symbol by fully packing the data into 8 bit symbols, which causes a symbol clock not to have an integer relationship with the pixel clock. A transmitter of the symbol can not use a pixel clock as the symbol clock, which forces the use of more complex circuits to derive a symbol clock pulse for conveying the symbol. Furthermore, a "sink" (i.e., to where the symbol is conveyed), can not directly recover the pixel clock from a receive symbols by a simple "divide" function.

DETAILED DESCRIPTION

Figure 1:
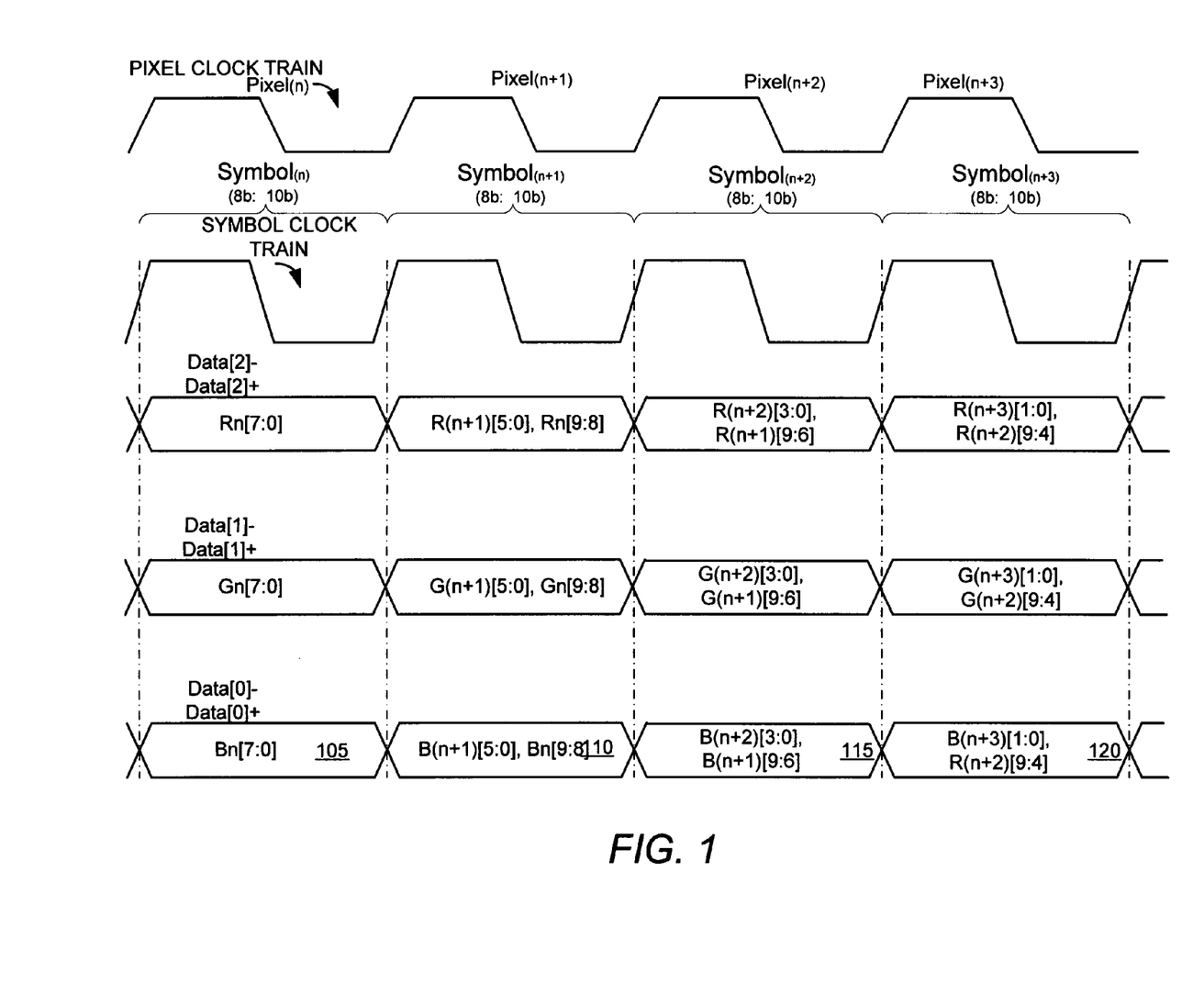
FIG. 1 is a timing diagram of a pixel clock/symbol mismatch.

FIG. 1 is a timing diagram of a pixel clock/symbol mismatch. Three colors are represented as being conveyed in symbols in parallel to one another: Blue (B"), Green ("G"), and Red ("R"). In FIG. 1, B is serial line [0], G is serial line [1], and R is serial line [2]. In FIG. 1, symbols are transmitted as opposite polarity differentials. In other words, each serial line (B, G, R) has a "+" and a "−" component, and both convey correlated symbol information, albeit with opposite coding polarity signals.

FIG. 1 also has a symbol clock train, which correlate to symbols Symbols$_{1}$-$_{4}$. This represents pulses of symbols that are used to convey video bit pixel information. One pulse of a symbol pulse equals the conveyance of one symbol, such as a "Symbol$_{(n)}$", "Symbol$_{(n+1)}$", "Symbol$_{(n+2)}$". Each consecutive symbol in a time period for a given color is designated as symbol 105, 110, etc.

Each symbol, such as symbol 105, has pixel bit information embedded within. Each pixel clock pulse is referenced as indexed by the symbol "k". This pixel bit information is generated according to its own pixel clock (not illustrated). For instance, for the illustrated 10 bit wide pixel, symbol 105 of Symbol$_{(n)}$ carries pixel bits 0 to 7 from pixel clock pulse "n" for bits 0 to 7 of a pixel clock pulse, but not pixel bits 8 and 9. Symbol 110 of Symbol$_{(n+1)}$ carries pixel information from pixel clock pulse "n+1" for pixel bits 5:0 and pixel bits 9:8 for pixel "n." Symbol 115 of Symbol$_{(n+2)}$ carries pixel bits 3:0 from pixel "n+2" and pixel bits 9:6 for pixel "n+1", and so forth. As is illustrated, a given symbol "n+(x)" does not have a complete set of video bits for a pixel clock pulse "n+(x)."

The above can be for the following reason or reasons. In FIG. 1, a "8b/10b" encoding is illustrated. "8b" refers to the fact that the information size is 8 bits that can be carried per symbol, and "10b" refers to the fact that 10 bits per symbol is used, the extra 2 bits being used by the physical layer of a transmission device in symbol transference. However, in the illustration of FIG. 1, the original pixel clock has 10 bits of video information for each clock pulse. Therefore, symbol 105 can only accommodate the first 8 pixel bits (bits [0:7]). Symbol 110 of Symbol$_{(n+1)}$ therefore carries the last two pixel bits from pixel clock "n", (bits [9:8]), and also the first 6 pixels bits from pixel clock "n+1" (bits [5:0]). This continues for symbol 115 of Symbol$_{(n+2)}$ and Symbol$_{(n+3)}$ of symbol 120.

Therefore, in order for the symbols to keep up with the pixel data, the symbol clock has to run 10/8 times as fast as the pixel clock. This can require additional circuitry, esp. as the symbol clock is not an integer multiple of the pixel clock. Furthermore, in order to reconstitute the pixel clock pulse at a sink, the sink has to multiply the recovered symbol clock by 8/10 to regenerate the correct pixel clock pulse. This can require even more additional circuitry.

Figure 2:
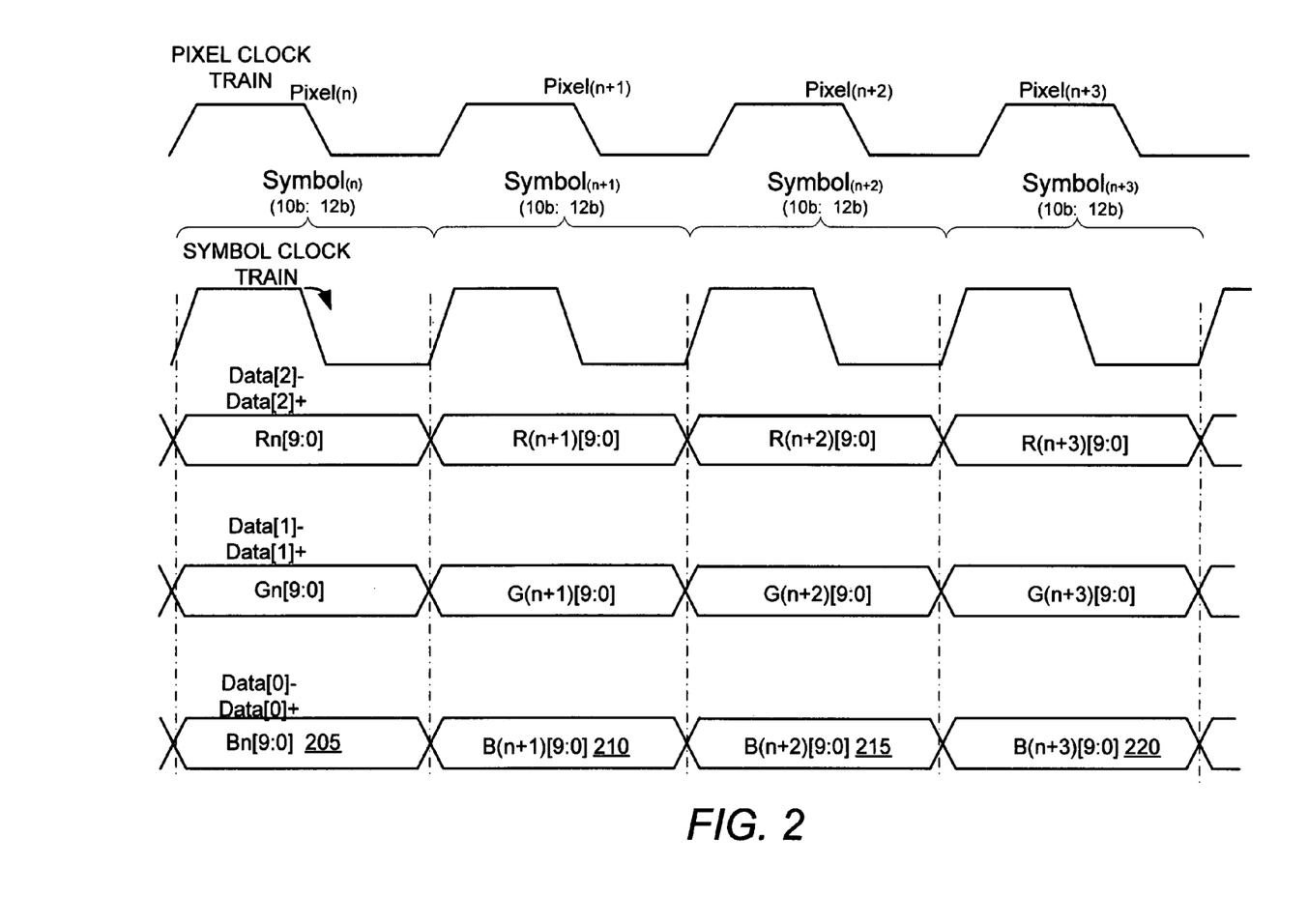
FIG. 2 is a first timing diagram of a variable pixel clock/symbol clock ratio according to some embodiments.

FIG. 2 illustrates a pixel clock/symbol match according to some embodiments. A symbol 205 of Symbol$_{(n+2)}$ is adjusted to be able to send 10 pixel bits per symbol, as a "10b/12b" symbol. The size of the symbol encoding (i.e., "8b/10b," "10b/12b," etc.) can occur as a function of a pixel format ("width") signal, as will be described below. In FIG. 2, there is no overflow from a prior pixel clock pulse to a subsequent pixel clock pulse, as each symbol symbols 210, 215, 220 can accommodate the full array of corresponding video bits per corresponding pixel clock pulse. In other words, the symbol clock matches the pixel clock. In some embodiments, there may be a phase difference.

Figure 3:
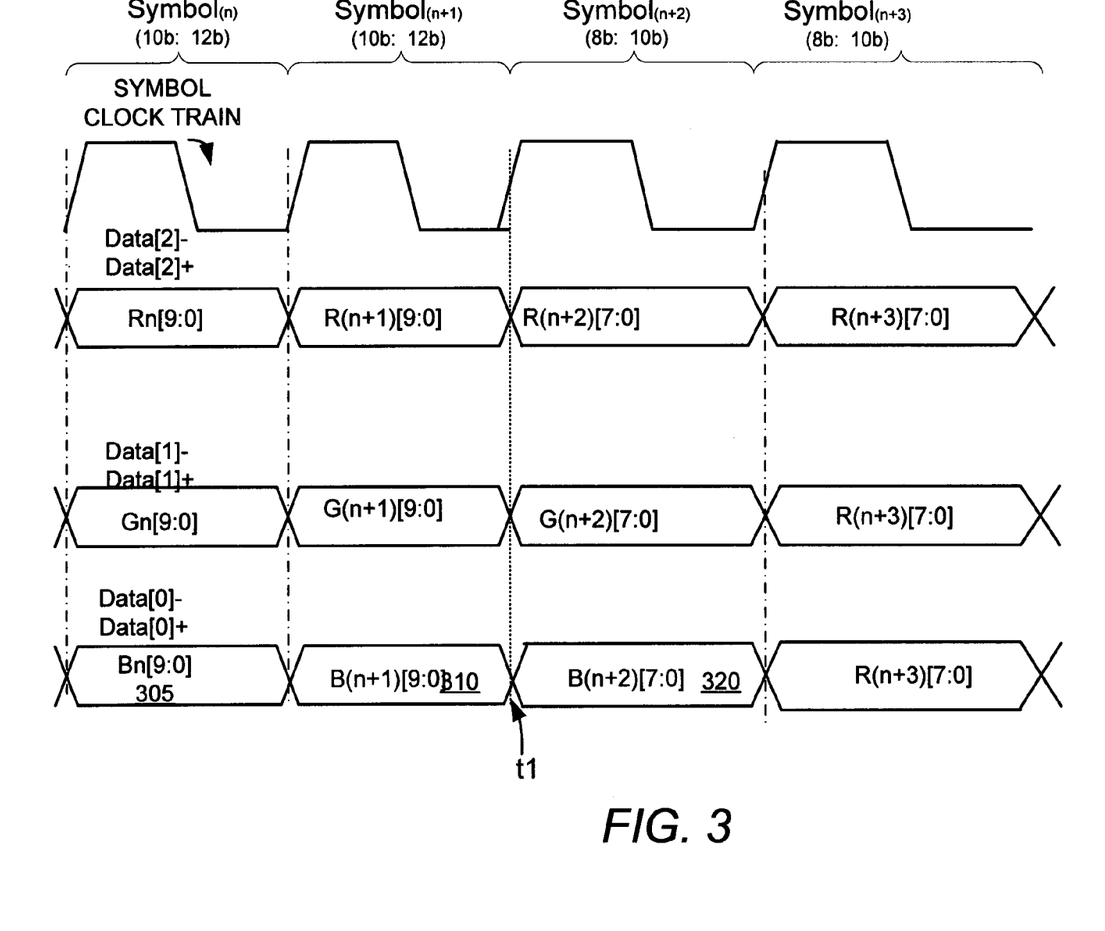
FIG. 3 is a second timing diagram of a variable pixel clock/symbol clock ratio according to some embodiments.

FIG. 3 illustrates some embodiments of a variable pixel clock/symbol match wherein the pixel clock rate, and hence the symbol clock rate, changes between a consecutive transmission of symbols. In Symbol$_{(n)}$ symbols 305, and Symbol$_{(n+1)}$ 310, the bit rate for the video pixel is equal to 10, as illustrated in B$_n$[9:0], B$_{n+1}$[9:0], B$_{n+2}$[9:0] of the Blue video pixels. However, at time "t$_1$", a pixel clock rate changes to 8 bits per pixel clock signal. Therefore, less information is packed per pixel clock pulse. This results in a change of a received pixel format signal. Therefore, the symbol rate changes as a function of the received pixel format signal, from "10:12" to "8:10", and less bits are packed per symbol in the same time period, as illustrated in Symbol$_{(n+1)}$ 320, Symbol$_{(n+2)}$ 325. Therefore, in some embodiments, the pixel format changes, but the symbol rate does not change because the symbol rate equals the pixel rate regardless of the format.

Figure 4:
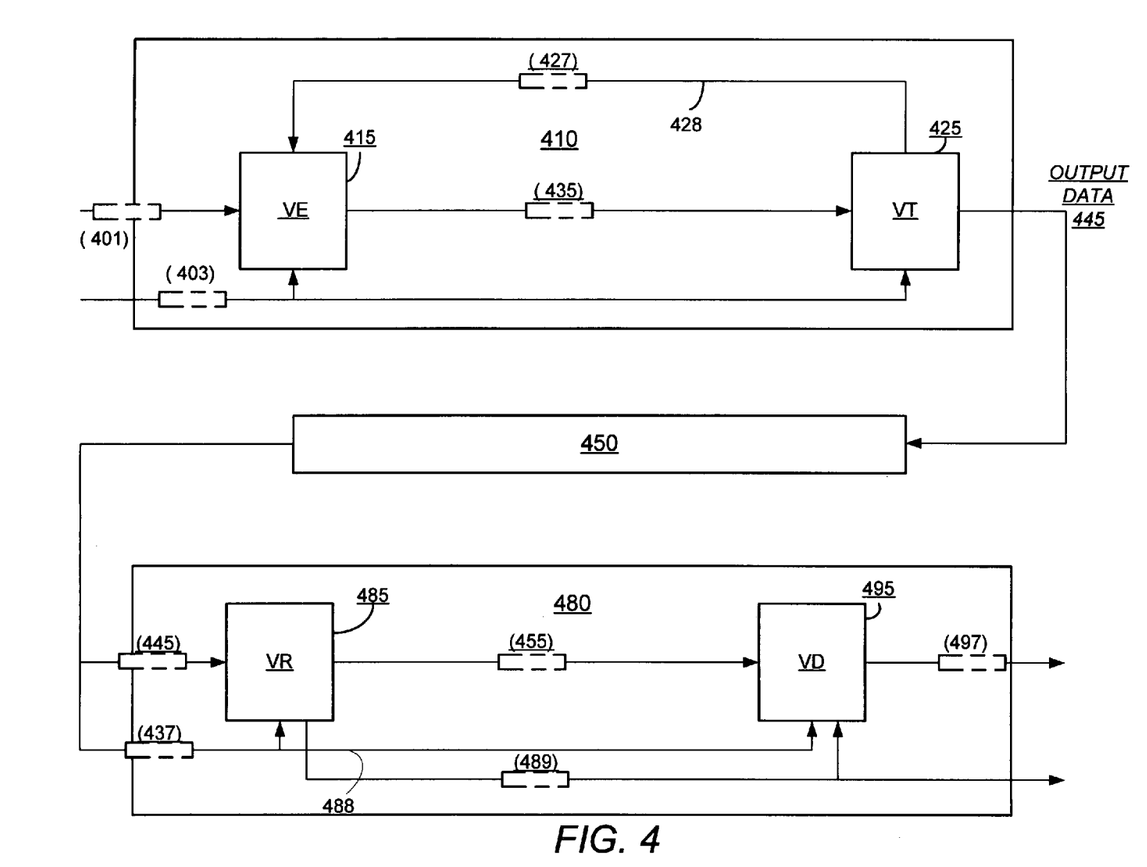
FIG. 4 is a schematic diagram of a system for conveying a variable-rate pixel clock and symbol data according to some embodiments.

FIG. 4 illustrates a system 400 for transmitting and receiving video with a variable format according to some embodiments. A source 410 is coupled through an interface cable 450 to a sink 480. The source 410 receives a transmitter (TX) video pixel data 401 and pixel format 403. Sink 480 outputs a receiver pixel clock pulse 489 and a video pixel data 497.

Source 410 has a variable encoder ("VE") 415 coupled to a variable transmitter ("VT") 425. "Variable," such as in VE 415, can be generally defined as employable with a plurality of pixel formats, such as a "width" of pixel bits per color. In some embodiments, an adjustable timing for symbol transmission is used, and the VE 415 can adjust the size of the symbol accordingly. In some embodiment, variable pixel formats may also be handled with symbol transmissions without changing the symbol rate.

A pixel clock pulse 427, video pixel data 401, and pixel format 403 are received by variable encoder 415. Pixel format 403 may be a signal from a video system (not illustrated) that indicates the transmission rate of bits per pixel. Pixel format 403 can be set at various levels by a video system (not illustrated). Symbol 435, corresponding to TX video pixel data 401, is encoded by VE 415 for a selected size of symbol "8b/10b", "10b/12b" and so on, as a function of the pixel format 403 (i.e., the 8b/10b would be a symbol size of 10 bits wide for a pixel color width of 8 bits wide). The time allotted to each symbol transmission is a function of pixel clock pulse 427, which is generated by a variable transmitter 425, as will be detailed below. The pixel clock 427 may be generated based upon the pixel format 403.

In some embodiments, VE 415 can dynamically adjust to changes in pixel format 403 in real time. For instance, VE 415 may support a real time transition of 6 bit clock pixel with 8 bit symbol ("6b/8b") to an 8 bit clock pixel with a 10 bit symbol, ("8b/10b"), and so on (in some embodiments, each symbol with an extra packing of overhead 2 bits data in symbol 435) as determined by pixel format 403.

Source 410 has VT 425 coupled to VE 415. VT 425 receives symbol 435 and pixel format 403, and generates pixel clock pulse 427 over a pixel clock 428 to be conveyed back to VE 415. Symbol 435 is then transmitted over interface cable 450 from VT 425 to sink 480 as output data 445. In some embodiments, VT 425 performs a conversion of symbol 435, received in a parallel bit format, to a serial bit format as part of output data 445. In some embodiments, pixel format 403 is also conveyed to sink 480, and is received as pixel format 437, and may be conveyed over the same lines as video data or conveyed separately.

Sink 480 has a variable receiver (VR) 485 and a variable decoder (VD) 495. VR 485 receives output data 445, which contains information corresponding to symbol 435. VR 485 generates pixel clock pulse 489 from the output data 445. In some embodiments, the pixel format 437 is also used to generate the pixel clock pulse 489. VR 485 also generates a derived symbol 455 from output data 445.

The derived symbol 455, pixel clock pulse 489, and pixel format 437 are then input into VD 495. VD 495 then uses the pixel format 437 to determine which of the plurality of decoders of the VD 495 to use, and then decodes derived symbol 455 as video pixel data 497. From VD 495, the video pixel data 497 is output. Sink 480 therefore generates pixel clock pulse 489 and video pixel data 497, both of which may be used to generate a video display.

Figure 5:
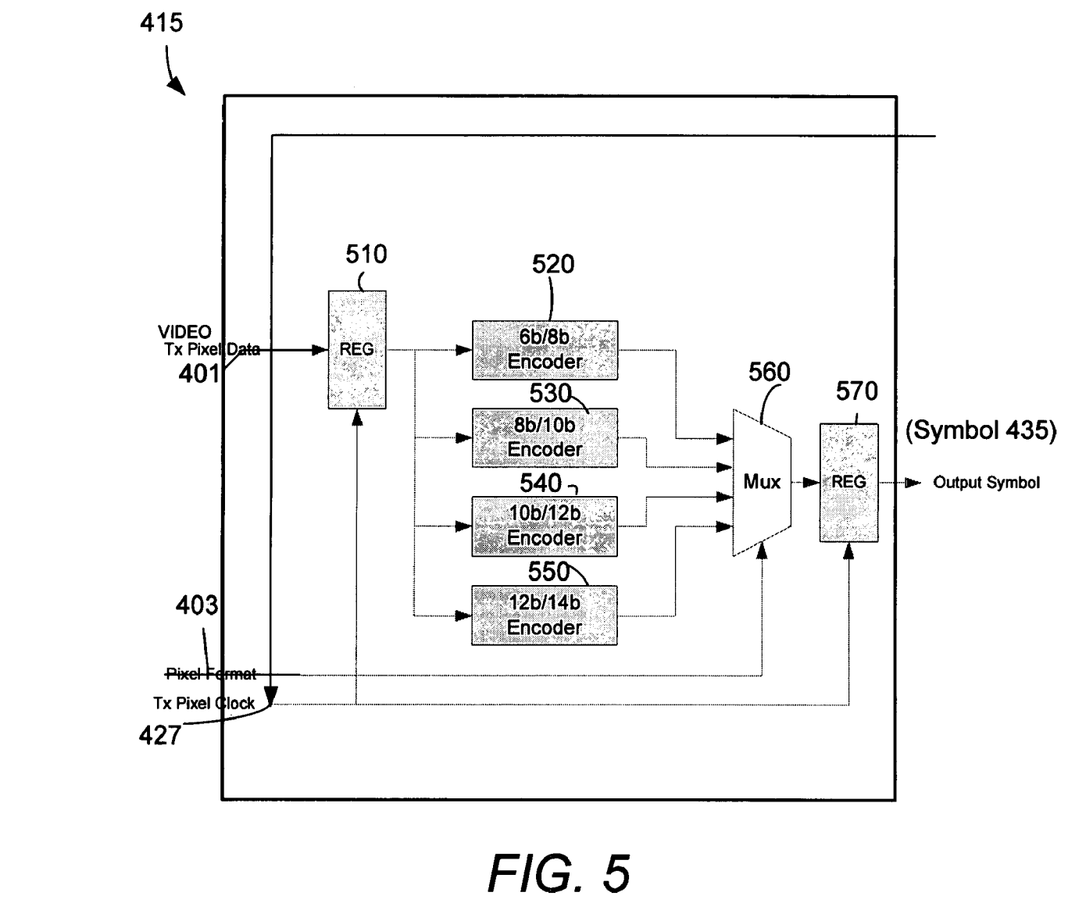
FIG. 5 is a schematic diagram of a variable decoder according to some embodiments.

FIG. 5 illustrates VE 415 according to some embodiments. VE 415 receives video pixel data 401, pixel format 403, and pixel clock pulse 427.

VE 415 has a register 510 to receive TX pixel data 401. Register 510 is latched by pixel clock pulse 427. Register 510 is coupled to encoders 520, 530, 540, 550, which are in parallel. The outputs of encoders 520, 530, 540 and 550 are coupled to inputs of a multiplexer (MUX) 560, which is in turn output to a register 570. Pixel format 403 is used by MUX 560 for selecting an input received from encoders 520, 530, 540 and 550. Furthermore, register 570 is also latched by pixel clock pulse encoders 520, 530, 540, 550 may be reduced to a single encoder which changes its output based on format.

In some embodiments, VE 415 works as follows. Video pixel data 401 is received at register 510. Pixel clock pulse 427 of VE pixel clock 416 acts as a clock impulse which allow register 510 to accept signals and output video pixel data 401. The output of register 510 is then conveyed to parallel encoders 520 to 550.

Each encoder 520 to 550 takes a series of bits of video pixel data 401 (the first number, such as 6 bits for encoder 520, 8 bits for encoder 530, and so on), and encodes it as its equivalent symbol, and typically packs two extra bits. In some embodiments, these two extra bits may be used for direct current balance on the link and to allow the receiver to recover the clock. In some embodiments, if the format is 6 bits, then the 6b/8b encoder output is selected. If 8 bits, then the 8b/10b output is selected. As each of these encoders 520 to 550 are encoding different lengths, they parse video pixel data 401 into symbols corresponding to different widths (i.e., 6 video bits per symbol per encoder 520, 8 video bits per symbol per encoder 530, and so on). Furthermore, each encoder 520 to 550 may define the video data which is used for starting and stopping encoding at different bits. These various symbols outputted by encoders 520 to 550 are then conveyed to MUX 560. In some embodiments, the symbols are each generated and conveyed to MUX 560 in parallel format.

MUX 560 then uses pixel format 403 to select one of the outputted symbols of encoders 520-550. The output selected at MUX 560 is then conveyed to register 570. Register 570 receives both the output of MUX 560 and pixel clock pulse 427 of VE pixel clock 416. On an enabling signal received on pixel clock pulse 427, register 570 conveys symbol 435 out of VE 415. This may be to VT 425. In some embodiments, registers 510 and 570 serve to help keep a synchronization of signals within VE 415.

Figure 6:
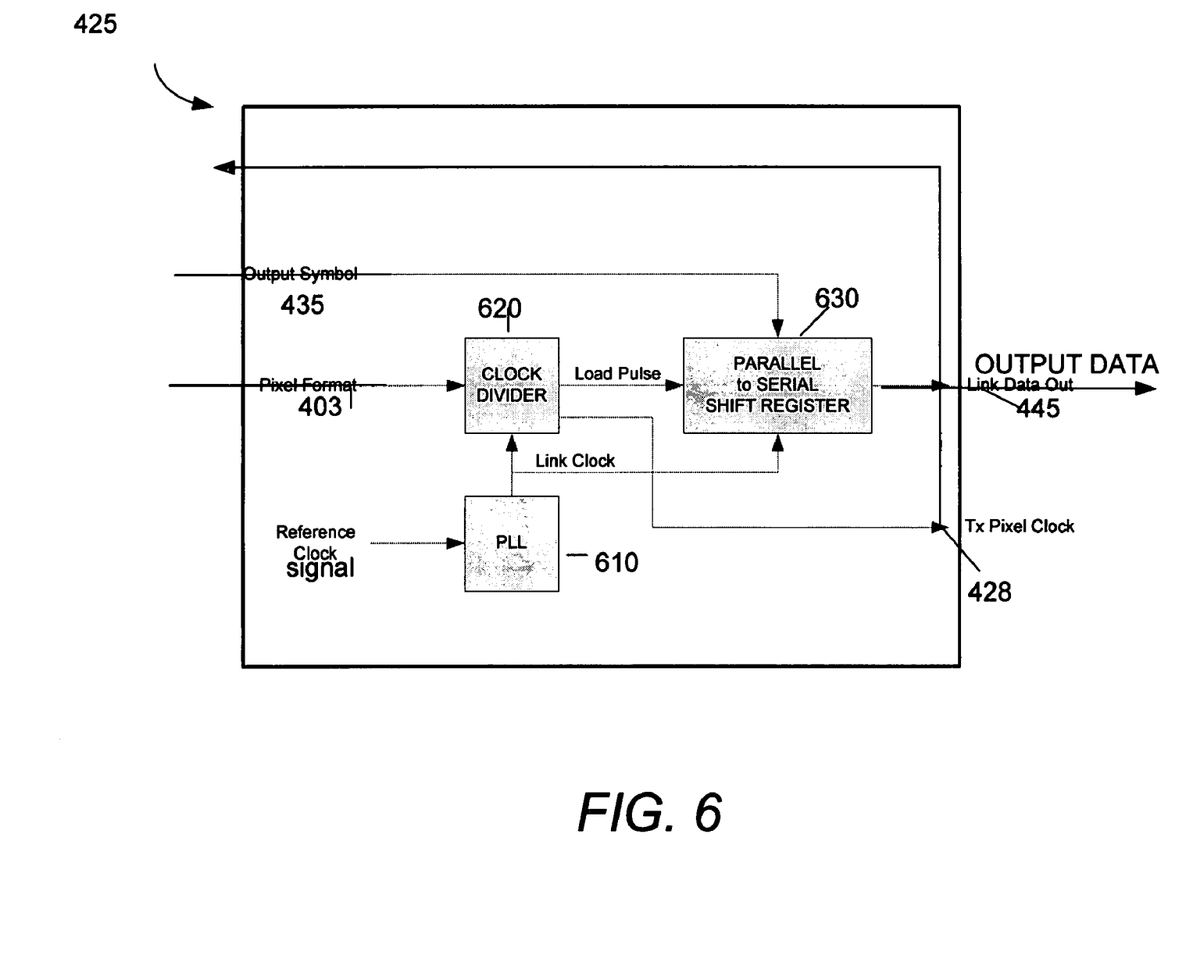
FIG. 6 is a schematic of a variable transmitter according to some embodiments.

FIG. 6 illustrates VT 425 according to some embodiments. A phased locked loop (PLL) 610 receives a reference clock signal from a reference clock (not shown). A clock divider 620 receives an output from PLL 610 and also receives pixel format 403. A parallel to serial shift register (PS register) 630 receives both a clock pulse from the output of PLL 620 and a load pulse from divider 620 and also the symbol 435. PLL 610 also generates pixel clock pulse 427 conveyed by pixel clock 428 for use by VE 415. PS register 630 then generates output data 445.

In some embodiments, VT 425 can operate as follows. A reference clock signal is received at PLL 610. PLL 610 regenerates the reference clock signal, perhaps increasing or decreasing the frequency or shifting a phase of the reference clock signal, to generate the link clock which is the clock for each output bit of VT 425, and then outputs a clock pulse of the link clock to clock divider 620. Clock divider 620 uses pixel format 403 to divide the link clock output of PLL 610. Clock divider 620 generates a load pulse to PS register 630, which loads symbol 435 to PS register 630. In other words, after VE 415 has used pixel format 403 to select the proper encoding, output is generated by clock divider 620 at a specific rate as output data 445 as a function of pixel format 403 and the PLL 610. The link clock output of PLL 610 is also used by PS register 630 for internal timing in converting the parallel data to serial data bits. Clock divider 620 also uses PLL 610 link clock output and pixel format 403 to generate the pixel clock pulse 427. Pixel clock pulse 427 is conveyed over pixel clock 428 back to VE 415, and is used by both registers 510, 570 to synchronize VE 415.

In some embodiments, symbol 435 is received in parallel by PS register 630. In some embodiments, a load pulse is generated by clock divider 620 allowing for symbol 430 to be received by PS register 630. Then, PS register 630 generates a serial version of symbol 435 as output data 445. In some embodiments, pixel format 403 is also embedded within output data 445 as pixel format 437.

Figure 7:
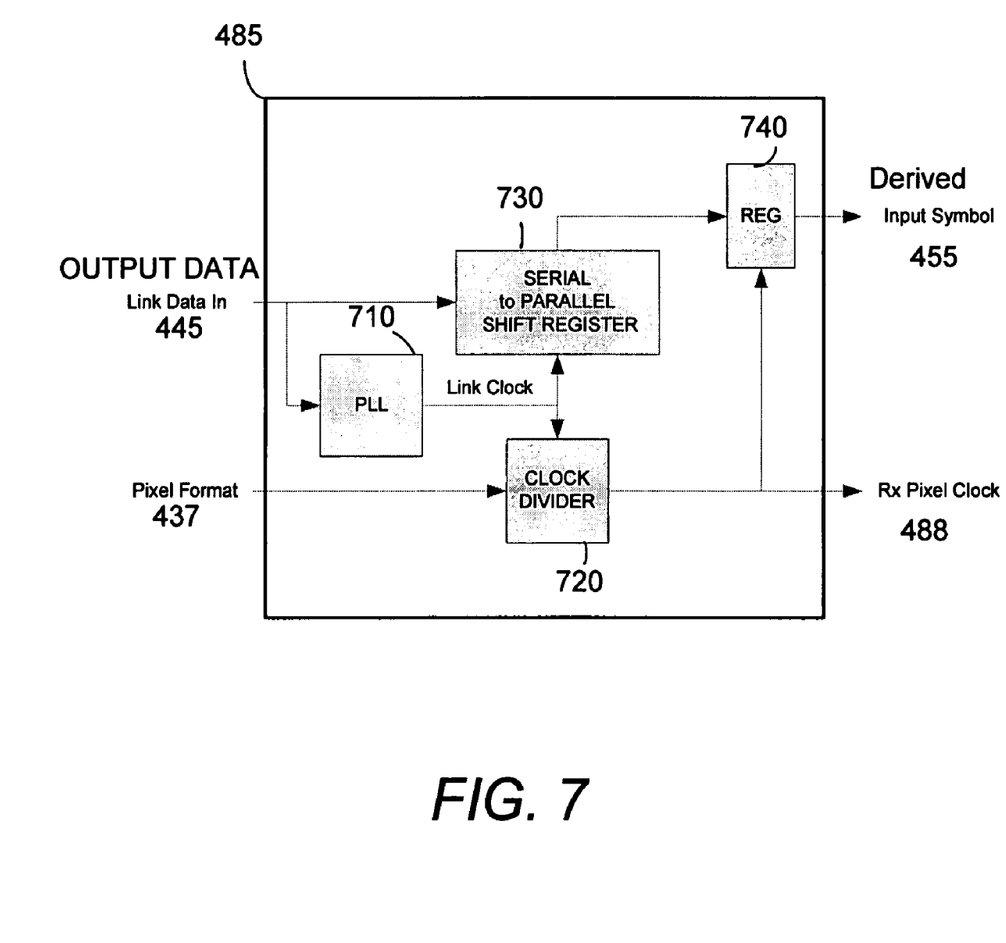
FIG. 7 is a schematic diagram of a variable receiver according to some embodiments.

FIG. 7 illustrates some embodiments of VR 485. In some embodiments, both output data 445 and pixel format 437 may be received by VR 485.

Output data 445 is conveyed both to a PLL 710 of VR 485 and a serial to parallel shift register (SP register) 730. In some embodiments, PLL 710 uses bit rates of reception of output data 445 as an index of activity level to generate clock pulses. In some embodiments, the PLL 710 uses the bit transitions to generate a bit rate clock and the link clock. The clock pulses are conveyed to SP register 730 and a clock divider 720. SP register 730 then converts serial output data 445 to parallel data into a register 740, after receiving the proper number of pulses from PLL 710 link clock output. Pixel format 437 is also used in conjunction with PLL 710 as input to clock divider 720 to generate pixel clock pulse 489 over pixel clock 488. Pixel clock pulse 489 is also used to enable register 740 to output the derived symbol 455 when register 740 is loaded.

Figure 8:
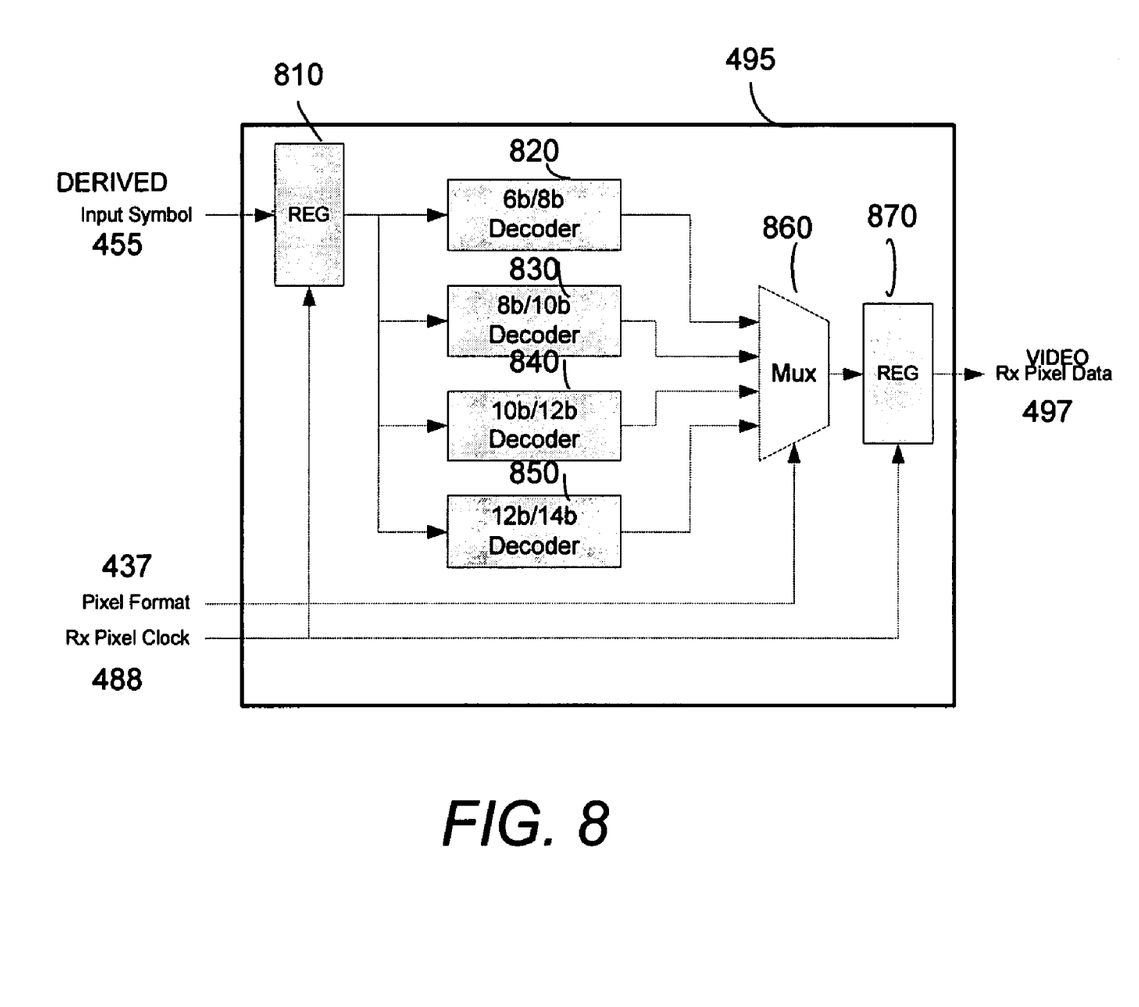
FIG. 8 is a schematic diagram of a variable encoder according to some embodiments.

FIG. 8 illustrates some embodiments of VD 495. VD 495 receives derived symbol 455, pixel format 437, and pixel clock pulse 489.

VD 495 has a register 810 to receive derived symbol 455 and is also latched by pixel clock pulse 489. An output of register 810 is coupled to parallel decoders 820, 830, 840, 850. Outputs of decoders 820, 830, 840 and 850 are each coupled to a multiplexer (MUX) 860, which is in turn output to a register 870. In some embodiments, MUX 860 selects one of its inputs as a function of pixel format 437. Register 870 is latched by pixel clock pulse 489. Register 870 outputs video pixel data 497.

In some embodiments, VD 495 works as follows. Derived symbol 455 is received at register 810. Pixel clock pulse 489, received over pixel clock 488, acts as a clock impulse which allows register 810 to accept at least part of derived symbol 455, and output signals according in synchronization with pixel clock pulse 489. The output of register 810 is then conveyed to decoders 820 to 850.

Each decoder 820 to 850 takes a series of parallel bits (as embodied in input symbol 455), and decodes it as its output data. As each of these decoders 820 to 850 are decoding different lengths, each decoder 820 to 850 may have a different output. These different outputs of the various decoders 820-850 are then conveyed to MUX 860.

MUX 860 then uses pixel format 437 to select one of the outputs of encoders 820-850. The selected output is then conveyed to register 870. Register 870 receives both the output of MUX 860 and pixel clock pulse 489. Register 870 serves to help keep synchronization of output signals of VD 495, such as video pixel data 497. On an enabling signal received from pixel clock pulse 489, register 870 conveys video pixel data 497 to outside of sink 480.

Figure 9:
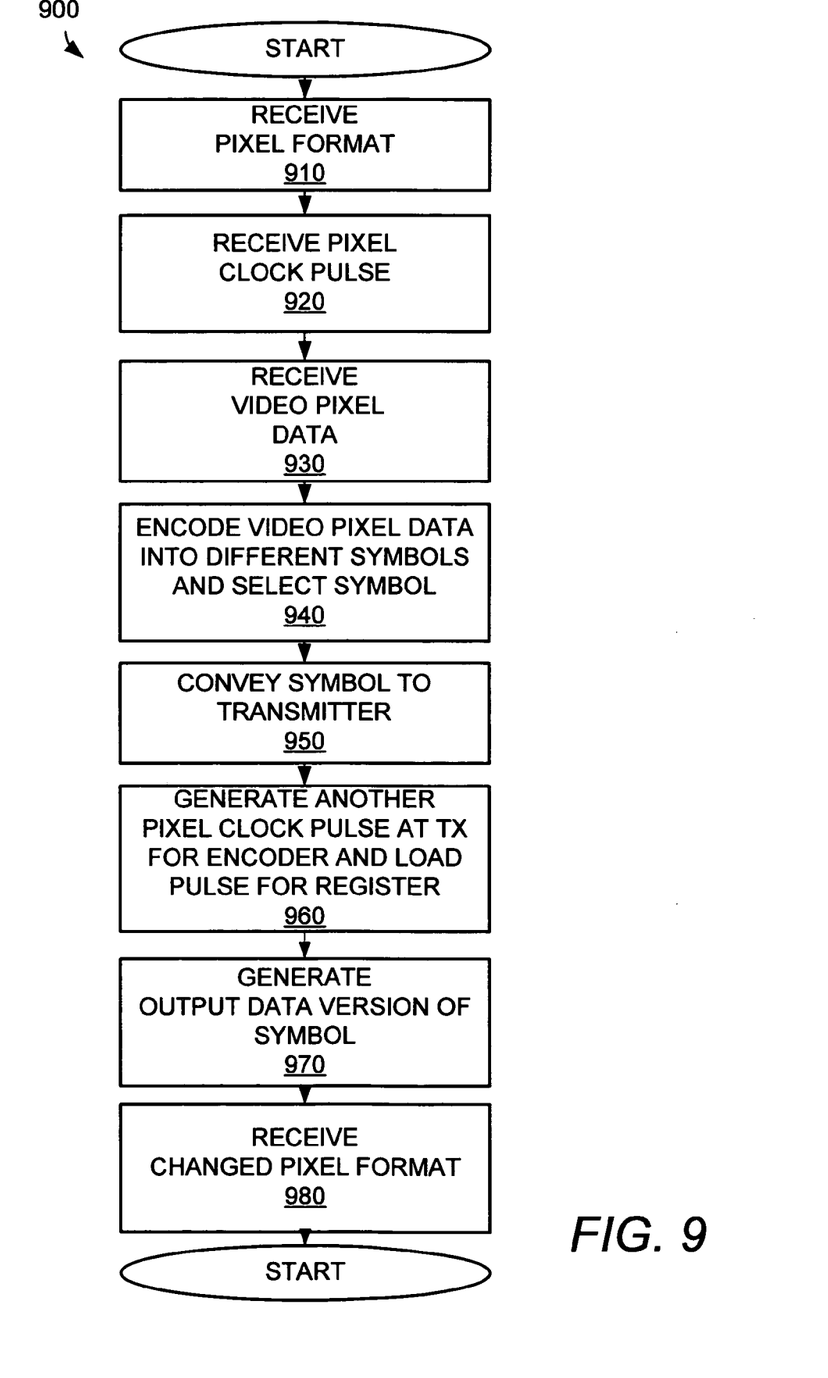
FIG. 9 illustrates a method of variable encoding and transmitting a variable pixel width according to some embodiments.

FIG. 9 illustrates a method 900 for encoding and transmitting video data in source 410 according to some embodiments. Note that the order of the method 900 can be changed in some instances.

In 910, pixel format 403 is received by both VE 415 and VT 425 of source 410. 910 advances to 920.

In 920, VE 425 generates pixel clock pulse 427. VE 415 receives pixel clock pulse 427 from VT 425. 920 advances to 930.

In 930, VE 415 of source 410 receives video pixel data 401. 930 advances to 940.

In 940, video pixel data 401 is encoded into different symbols 435, such as a "6b/8b" symbol, a "8b/10b" symbol, and so on, by encoders 520-550 of the VE 415. Then, one of the different symbols is selected by MUX 560. In some embodiments, the selection is a function of pixel format 403. 940 advances to 950.

In 950, an output of MUX 560, a selected symbol, symbol 435, is then conveyed from VE 415 to register 570 of VT 425 as a function of pixel clock pulse 427. 950 advances to 960.

In 960, another pixel clock pulse 427 is generated by VT 425 and conveyed to VE 415 for use with encoding of more pixel data 401 as a function of the selected symbol 435 and the pixel format 403. In some embodiments, a load pulse for PS register 630 to latch 435 is also generated. 960 advances to 965.

In 970, output data 445 is generated by VT 425 as a function of a pixel clock pulse 427. Output data 445 is then transmitted from source 410 over interface link cable 450. In some embodiments, the output data is in serial form. In some embodiments, pixel format 403 is conveyed in or multiplexed with output data 445.

In further embodiments, in 980, pixel format 437 is changed from a first format to a second format, which may have consequential shifts in timing, symbol size, and so forth within system 400. In some embodiments, 920 through 970 may repeat.

Figure 10:
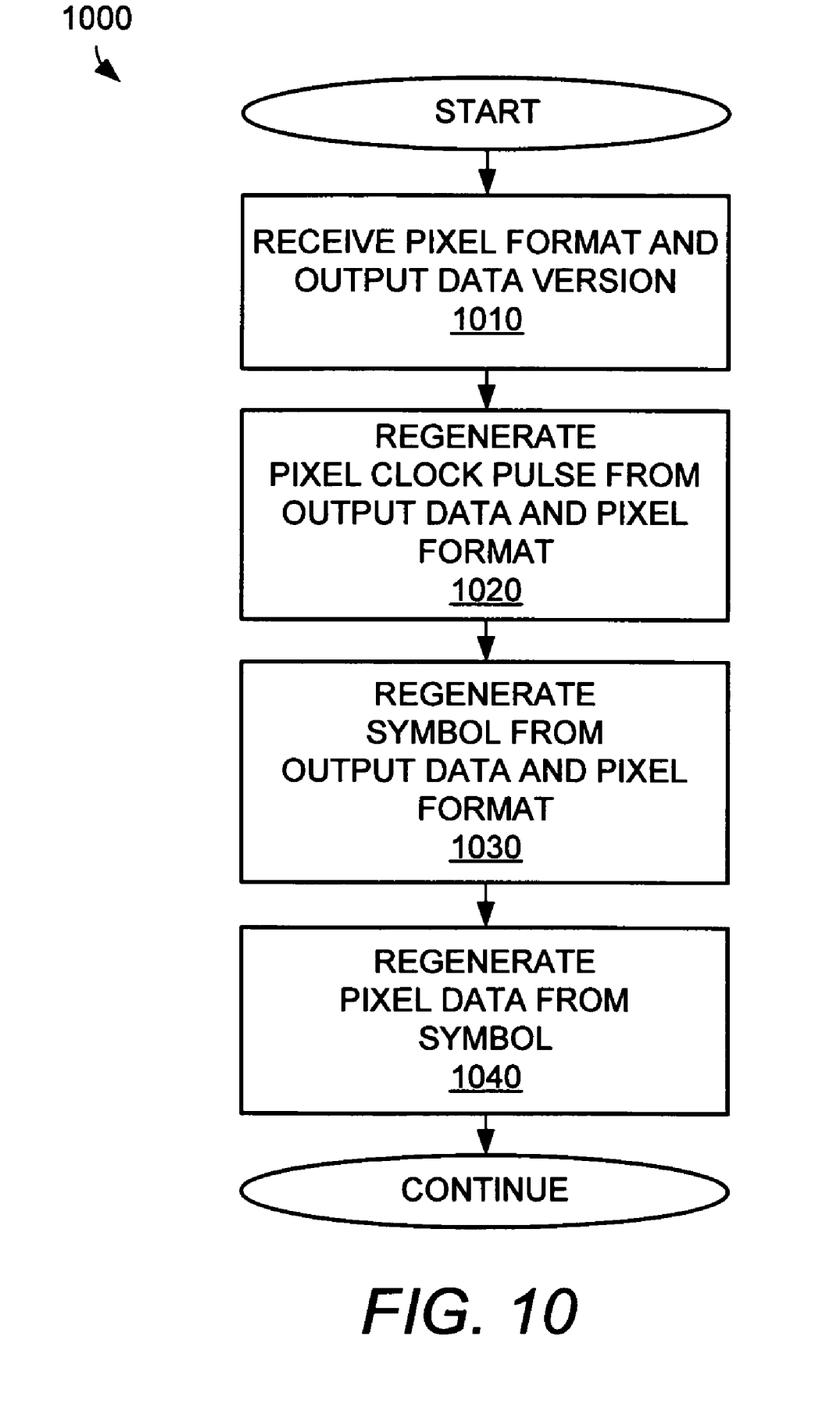
FIG. 10 illustrates a method of variable decoding and receiving a variable pixel width according to some embodiments.

FIG. 10 illustrates a method 1000 for receiving and decoding video data in the sink 480 according to some embodiments. Note that the order of the method 1000 can be changed in some instances.

In 1010, output data in 445 is received by VR 485 of sink 480. Also, in some embodiments, pixel format 437 is also received by both VR 485 and VD 495 of sink 480. 1010 advances to 1020.

In 1020, pixel clock pulse 489 is regenerated through use of output data 445 and pixel format 437 of VR 485. Pixel clock pulse 489 can be an output of clock divider 720 of VR 485. In some embodiments, a link clock pulse is also generated. 1020 advances to 1030.

In 1030, VR 485 generates derived symbol 455 from output data in 445 and pixel format 437. In some embodiments, link clock output (i.e., PLL output) and pixel clock output are used to regenerate output data. 1030 advances to 1040. In some embodiments, a symbol is conveyed to a decoder, another clock pulse to decode the symbol is also cesalaeh.

In 1040, video pixel data 497 is decoded from derived symbol 455, pixel format 437, and pixel clock pulse 489. In some embodiments, video pixel data 497 and pixel clock pulse 489 are used to generate a video display.

Figure 11:
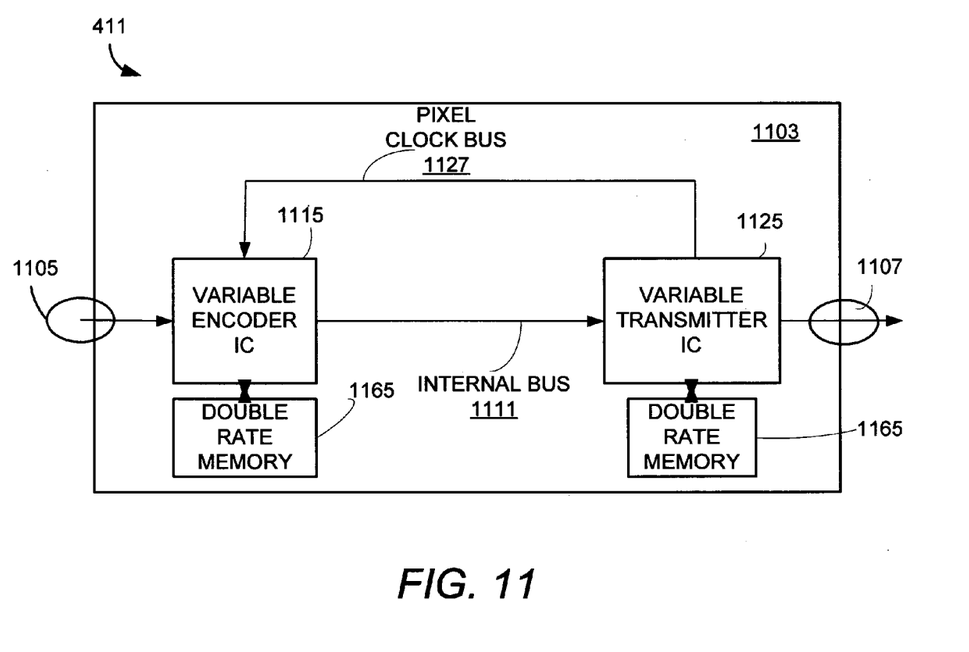
FIG. 11 illustrates a system having a variable encoder, variable transmitter, mother-board and double-date rate memory element.

FIG. 11 illustrates a source 411 for generating output data 445 and conveying pixel format 403 according to some embodiments. The system 1100 has a motherboard 1103, an input port 1105, and an output port 1107. VE 415, embodied as an integrated circuit (IC) 1115, is coupled to input port 1105. VT 425, embodied as IC 1125, is coupled to output port 1107.

IC 1125 is also coupled over an internal bus 1111 to IC 1115. VT IC 1125 is also coupled via a pixel clock bus 1127 to IC 1115. Both IC 1115 and IC 1125 are each coupled to their own respective double rate memories 1165, which may be used for storing, for example, symbol 435. Input port 1105 may receive pixel data 401 and pixel format 403. Output 1107 may transmit output data 445 and may further convey pixel format 403 as format 437.

The several embodiments described herein are solely for the purpose of illustration. Some embodiments may include any currently or hereafter-known versions of the elements described herein. Therefore, persons in the art will recognize from this description that other embodiments may be practiced with various modifications and alterations.

What is claimed is:

1. An apparatus, comprising:
   a source, including:
   an encoder that encodes a pixel of video data as a symbol;
   a selection unit that selects the symbol, wherein a selection of the symbol is a function of a pixel format that is of one of a plurality of pixel formats employable by the apparatus; and
   a sink, including:
   a variable receiver that (i) receives output data from the source, (ii) generates a derived symbol, and (iii) regenerates a pixel clock pulse; and
   a variable decoder that receives the derived symbol and pixel clock pulse from the variable receiver and outputs video pixel data.

2. The apparatus of claim 1, further comprising a plurality of encoders at the source that encode the pixel of video data as a one of a plurality of symbols, wherein each encoder has a different symbol encoding format.

3. The apparatus of claim 2, wherein the selection unit selects one of the plurality of symbols as a selected symbol.

4. The apparatus of claim 3, wherein the selection unit comprises a multiplexer.

5. The apparatus of claim 1, wherein a clock signal is generated at the source as a function of the pixel format.

6. The apparatus of claim 5, wherein the clock signal is employed by a first unit that receives the pixel data and conveys the pixel data to at least one encoder; and
   wherein the clock signal is farther employed by a second unit that outputs a selected symbol.

7. The apparatus of claim 1, further comprising a transmitter at the source that transmits the output data derived from a selected symbol.

8. The apparatus of claim 7, wherein the output data derived from the selected symbol is a function of a parallel to serial conversion of the selected symbol.

9. The apparatus of claim 1, wherein a selected symbol corresponds to a given number of bits of video pixel data transmitted during a given time period.

10. The apparatus of claim 1, wherein a selected symbol comprises at least one extra bit more than in a correlated video pixel data.

11. A method, comprising:
    receiving a pixel format at a sink;
    receiving a pixel symbol in an output data at the sink;
    regenerating a pixel clock pulse from the output data and from the pixel format;
    regenerating, at the sink, the pixel symbol from the output data; and
    decoding a pixel data from the pixel symbol through a using of the pixel clock pulse.

12. The method of claim 11, further comprising:
    selecting, at a source, the pixel format from a plurality of employable pixel formats;
    receiving the pixel data at the source;
    selecting an encoding scheme as a function of a selected pixel format; and
    generating the pixel symbol at the source by applying the selected encoding scheme to the pixel data.

13. The method of claim 12, further comprising:
    selecting, at the source, a second pixel format from a plurality of employable pixel formats; and
    selecting, at the source, a second encoding scheme as a function of the second pixel format.

14. The method of claim 12, further comprising:
    generating the pixel clock pulse as a function of the pixel format; and
    conveying the video pixel data, as a function of the pixel clock pulse, to at least one encoder of a variable encoder, the encoder to correlate to the selected encoding scheme.

15. The method of claim 12, further comprising:
    generating a pixel clock pulse at the source as a function of received data at the source, the received data correlating to the pixel symbol; and
    conveying the link data and to at least one decoder of the variable decoder of the sink, the decoder to correlate to a selected decoding scheme; and
    regenerating the pixel clock pulse from the link data.

16. The method of claim 12, wherein said output data comprises link data.

17. The method of claim 11, further comprising rendering the pixel data with use of the pixel clock pulse.

* * * * *

UNITED STATES PATENT AND TRADEMARK OFFICE
CERTIFICATE OF CORRECTION

PATENT NO. : 7,627,182 B2  Page 1 of 1
APPLICATION NO. : 11/323930
DATED : December 1, 2009
INVENTOR(S) : Vasquez et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1007 days.

Signed and Sealed this

Second Day of November, 2010

David J. Kappos
*Director of the United States Patent and Trademark Office*